United States Patent [19]
Aoyagi et al.

[11] Patent Number: 4,647,622
[45] Date of Patent: Mar. 3, 1987

[54] THERMOPLASTIC RESIN COMPOSITION

[75] Inventors: Tatsuhiro Aoyagi; Tetsuya Shinmura, both of Chiba, Japan

[73] Assignee: Denki Kagaku Kogyo Kabushiki Kaisha, Tokyo, Japan

[21] Appl. No.: 735,896

[22] Filed: May 20, 1985

[30] Foreign Application Priority Data

May 18, 1984 [JP] Japan ................. 59-100109

[51] Int. Cl.$^4$ ............................. C08L 51/04
[52] U.S. Cl. ...................... 525/84; 525/75; 525/76; 525/85
[58] Field of Search ............ 525/84, 76, 75, 85

[56] References Cited

U.S. PATENT DOCUMENTS 4,302,378 11/1981 Linder et al. ............... 525/84
4,510,287 4/1985 Wu ........................... 525/84

FOREIGN PATENT DOCUMENTS 117241 of 1983 Japan ..................... 525/84

Primary Examiner—Jacob Ziegler
Attorney, Agent, or Firm—Sughrue, Mion, Zinn, Macpeak and Seas

[57] ABSTRACT

A thermoplastic resin composition well balanced among heat resistance, high-impact properties and moldability is provided, which composition comprises 50 to 90 parts by weight of a random copolymer (A) composed mainly of α-methylstyrene units and acrylonitrile units, 0.2 to 1.0 part by weight based on 100 parts by weight of the random copolymer (A), of an oligomer (B) composed mainly of α-methylstyrene units and acrylonitrile units and having a molecular weight of 200 to 500 and 10 to 50 parts by weight of a dienic rubber-aromatic vinyl monomer-vinyl cyanide graft copolymer (C).

4 Claims, No Drawings

THERMOPLASTIC RESIN COMPOSITION

BACKGROUND OF THE INVENTION

This invention relates to a thermoplastic resin composition having a good moldability and also well balanced between heat resistance and high-impact properties.

It has been well known that α-methylstyrene-acrylonitrile copolymers are generally blended with ABS resins to improve the heat resistance of ABS resins (e.g., see Japanese Patent Application laid-open No. Sho 58-117241/1983).

However, α-methylstyrene-acrylonitrile copolymers have a high thermal deformation temperature and nevertheless has a high melt viscosity; thus thermoplastic resin compositions consisting of such copolymers and ABS resins and having good heat resistance have a far lowered moldability as compared with that of general ABS resins. For improving the moldability of conventional thermoplastic resins hving a good heat resistance, it is effective to reduce the molecular weight of α-methylstyrene-acrylonitrile copolymers, but their high-impact properties and heat resistance lower exponentially. Further, in the case of addition of lubricants, too, their moldability and high impact properties are enhanced, but their heat resistance lowers. Thus, in the design of thermoplastic resin compositions having a good heat resistance, it has been the most important problem to balance the three factors of heat stability, moldability and high-impact properties.

SUMMARY OF THE INVENTION

The object of the present invention is to provide a thermoplastic resin composition having a good moldability and well balanced between high-impact properties and heat resistance.

The present invention resides in a thermoplastic resin composition comprising 50 to 90 parts by weight of a random copolymer (A) composed mainly of α-methylstyrene units and acrylonitrile units, 0.2 to 1.0 part by weight based on 100 parts by weight of said random copolymer (A), of an oligomer (B) composed mainly of α-methylstyrene units and acrylonitrile units and having a molecular weight of 200 to 500 and 10 to 50 parts by weight of a dienic rubber-aromatic vinyl-vinyl cyanide graft-copolymer (C).

DETAILED DESCRIPTION OF THE INVENTION

The present invention will be described more concretely.

The molecular weight of the α-methylstyrene-acrylonitrile copolymer as the component (A) is preferably in the range of 800 to 1,600 Å in terms of number average chain length measured on the basis of polystyrene. If the copolymer used has a number average chain length less than 800 Å, its moldability is improved, but its high-impact properties and heat resistance lower. On the other hand, if the copolymer used has a number average chain length more than 1,600 Å, the moldability lowers notably and further the residual strain of practically molded product becomes greater, which results in lowering the heat resistance of the molded product; thus the object of the present invention cannot be attained.

Further, the ratio ($\overline{A}_W/\overline{A}_N$) of the weight average chain length ($\overline{A}_W$) to the number average chain length of the α-methylstyrene-acrylonitrile copolymer is preferably in the range of 1.5 to 3.0. Even if the $\overline{A}_W/\overline{A}_N$ is either less than 1.5 or more than 3.0, the resulting copolymer cannot have properties which are superior in both of heat resistance and moldability. The α-methylstyrene-acrylonitrile copolymer is composed of 65 to 75% by weight of α-methylstyrene and 25 to 35% by weight of acrylonitrile. If the quantity of α-methylstyrene is less than 65% by weight, it is difficult to improve the heat resistance, while if the quantity exceeds 75% by weight in the case of conventional polymerization process, the remaining quantity of α-methylstyrene increases.

On the other hand, if the quantity of acrylonitrile is less than 25% by weight, the copolymerization is difficult so that it is impossible to obtain the copolymer with a satisfactory efficiency, while if it exceeds 35% by weight, notable lowering of heat resistance and degradation of color tone result.

The above α-methylstyrene-acrylonitrile oligomer as the component (B) has a molecular weight in the range of 200 to 500. If the α-methylstyrene-acrylonitrile copolymer has a molecular weight greater than 500, it is impossible to improve the moldability of the copolymer. The quantity of the lower molecular weight α-methylstyrene-acrylonitrile copolymer is preferably in the range of 0.2 to 1.0 part by weight based on 100 parts by weight of the random copolymer as the component (A). If it is less than 0.2 part by weight, it is difficult to improve the moldability, while if it exceeds 1.0 part by weight, the heat resistance lowers although the moldability is improved.

The above graft copolymer as the component (C) is obtained by graft-copolymerizing 25 to 60% by weight of a monomer mixture of an aromatic vinyl monomer with a vinyl cyanide in the presence of 40 to 75% by weight of a dienic rubber polymer according to known method. The dienic synthetic rubber polymer in the component (C) are, for example, polybutadiene rubbery polymers, acrylic rubbery copolymers such as those of butyl acrylate, ethylene-propylene-diene copolymer rubbery polymers, etc.

Further, examples of the aromatic vinyl monomer are styrene, p-methylstyrene, p-tert-butylstyrene, chlorostyrene, etc., and these may be used singly or in admixture of two or more kinds thereof.

Examples of the vinyl cyanide monomer are acrylonitrile, methacrylonitrile, etc.

As to the preferable properties of the aromatic vinyl monomer and the vinyl cyanide monomer, that of the aromatic vinyl monomer is 65 to 85% by weight and that of the vinyl cyanide monomer is 20 to 35% by weight.

In the resin composition of the present invention, if the sum of the random copolymer (A) and the graft copolymer (C) is rendered 100 parts by weight, the proportion of the random copolymer (A) is 50 to 90 parts by weight and that of the graft copolymer (C) is 10 to 50 parts by weight.

The thermoplastic resin composition of the present invention may be produced by mixing the α-methylstyrene-acrylonitrile copolymer as the component (A), α-methylstyrene-acrylonitrile oligomer as the component (B) and the graft copolymer as the component (C) by means of a general mixer such as Henschel mixer. Further, the thermoplastic resin composition may also be produced by simultaneously preparing the α-methylstyrene-acrylonitrile copolymer as the component (A)

and α-styrene-acrylonitrile oligomer as the component (B) according to a usual polymerization method such as suspension polymerization, followed by mixing these copolymers with the graft copolymer as the component (C).

Still further, the oligomer as the component (B) may be byproduced according to the method disclosed in Japanese Patent Publication No. Sho 45-1825/1970, but since its quantity produced increases, the heat resistance of the final composition lowers as shown in Comparative Examples.

Further, additives usually used such as plasticizer, stabilizer, coloring agent, etc., may be added to the thermoplastic composition of the present invention.

The present invention will be further described by way of Examples, but it should not be construed to be limited thereto and includes various modifications and alterations unless these do not surpass the gist of the present invention.

EXAMPLE 1

Preparation of α-methylstyrene-acrylonitrile copolymer

Into a 5 l capacity autoclave equipped with a stirrer were added purified water (2 kg) and tribasic calcium phosphate (20 g) and the mixture was sufficiently agitated while nitrogen gas was blown therein. Thereafter, α-methylstyrene (1.4 kg), acrylonitrile (0.6 kg), potassium persulfate (0.2 g) and catalysts indicated in Table 1, followed by purging the inside with nitrogen gas, heating the autoclave to raise the contents up to temperatures indicated in Table 1, carrying out polymerization reaction for 15 hours to complete polymerization, neutralizing the thus obtained slurry with 15% hydrochloric acid, dehydrating and drying at 80° C. to obtain a particulate polymer.

Measurement of lower molecular weight α-methylstyrene-acrylonitrile copolymer The particulate polymer prepared according to the above method was dissolved in methyl ethyl ketone, followed by subjecting the solution to deposition with methanol, filtering, and vaporizing the methanol filtrate to dryness to obtain a pasty substance which was then dissolved in 0.1% by weight tetrahydrofuran (THF). The solution was analyzed by GPC (6000A manufactured by Waters Co.). GSP-101 manufactured by Nippon Bunko Co. was used as the column. The GPC showed peaks of two components. The components were separately taken and subjected to measurement of molecular weight by FDMS manufactured by Nippon Denki Co. The peak on the higher molecular weight side exhibited a molecular weight of 1,120 to 1,260 and the peak on the lower molecular weight side exhibited a molecular weight of 224. The polymerization conditions and measurement results are shown in Table 1.

Preparation of graft copolymer

Into a 5 l capacity autoclave equipped with a stirrer, while nitrogen gas being blown therein, were fed a polybutadiene latex having an average particle diameter of 0.35μ and a concentration of 32% (2.5 kg), purified water (1.5 kg) and an aqueous solution (100 g) of a redox catalyst consisting of sodium formaldehyde xylate (1.6 g), ferrous sulfate (0.027 g) and tetrasodium ehtylenediamine tetraacetate (0.054 g), followed by raising the inner temperature to 50° C. with stirring and when the temperature reached 50° C., successively or continuously adding a monomer mixture of styrene (336 g), acrylonitrile (144 g), t-dodecylmercaptane (1.92 g) and diisopropylbenzene hydroperoxide (0.96 g) to complete the addition in 5 hours.

The inner temperature of the autoclave was raised to 70° C. and polymerization reaction was continued for 2 hours to complete the polymerization. The thus obtained graft polymer latex was coagulated with magnesium chloride, followed by washing, dehydrating and drying to obtain a white powdery graft copolymer.

Production and evaluation of thermoplastic resin composition

α-methylstyrene-acrylonitrile copolymer (1.4 kg) as the component (A) containing lower molecular weight α-methylstyrene-acrylonitrile copolymer as the component (B), the content of the component (B) being indicated in Table 1, and graft copolymer (0.6 g) as the component (C), were sufficiently mixed by means of Henschel mixer and then melt-kneaded by means of an extruder to obtain pellets.

The thus obtained thermoplastic resin composition was injection-molded to prepare sample pieces, which were then subjected to Vicat softening point test and Izod impact strength test. Further, the moldability of the pellet-form resin composition was evaluated through the spiral flow length according to spiral flow test.

The measurements of Vicat softening point and Izod impact strength was carried out according to the following JIS method:
(1) Vicat softening point: JIS K6870
(2) Izod impact strength: JIS K6871

The spiral flow test was carried out under the following conditions:
(i) Molding machine: Churchill 1040S manufactured by Kawaguchi Tekko Co.
(ii) Injection pressure: 50 kg/cm$^2$G
(iii) Cylinder temperature: 280° C.
(iv) Mold temperature: 40° C.

These results and the resin compositions are shown in Table 3.

TABLE 1

| Example | | Initiator | | Polymerization temperature (°C.) | Component A | | Component B | |
|---|---|---|---|---|---|---|---|---|
| | | Kind*[1] | Amount (% by weight /monomer) | | Number average chain length (Å) | $A_W/A_N$ | Molecular weight | Amount (% by weight) |
| Example 1 | Run No. 1 | a | 0.75 | 97 | 1120 | 2.3 | 224 | 0.63 |
| Example 1 | Run No. 2 | b | 0.79 | 85 | 1170 | 2.4 | 224 | 0.31 |
| Example 1 | Run No. 3 | a | 0.28 | 107 | 1080 | 2.5 | 224 | 0.86 |
| Compar. ex. 2 | Run No. 1 | c | 0.65 | 115 | 980 | 2.4 | 224 | 1.32 |
| Compar. ex. 2 | Run No. 2 | a | 2.44 | 97 | 770 | 2.6 | 224 | 0.67 |
| Compar. ex. 2 | Run No. 3 | a | 0.16 | 97 | 1650 | 2.5 | 244 | 0.61 |
| Compar. ex. 1 | | d | 0.06 | 70 | 1160 | 2.3 | 224 | 0.05 |
| Example 1 | Run No. 4 | e | 0.80 | 84 | 1090 | 2.3 | 224 | 0.28 |

COMPARATIVE EXAMPLE 1

Preparation of α-methylstyrene-acrylonitrile copolymer

Purified water (3 kg) and sodium dodecylbenzenesulfonate (225 g) were placed in an autoclave equipped with a stirrer and sufficiently agitated while nitrogen gas was blown therein, followed by adding α-methylstyrene (1.4 kg), acrylonitrile (0.6 kg), t-dodecylmercaptane (14 g) and potassium persulfate (0.9 g), bringing the inside of the system into nitrogen atmosphere, heating the autoclave to raise the temperature of the contents up to 70° C., and carrying out polymerization for 8 hours to complete polymerization. The thus obtained α-methylstyrene-acrylonitrile copolymer latex was coagulated with magnesium chloride, washed, dehydrated and dried to obtain a white powdery polymer.

Measurement of lower molecular weight α-styrene-acrylonitrile copolymer, preparation of graft copolymer and production and evaluation of thermoplastic resin composition were carried out in the same manner as in Example 1.

*¹TABLE 2

| Initiator | Name |
|---|---|
| a | 1,1-di-t-butylperoxy-3,3,5-trimethylcyclohexane |
| b | di-t-butylperoxy-hexahydroterephthalate |
| c | 2,5-dimethyl-2,5-di(t-butylperoxy)hexane |
| d | potassium persulfate |
| e | t-butyperoxy-isobutyrate |
| f | t-butyperoxy-hexahydroterephthalate |

COMPARATIVE EXAMPLE 2

Example 1 was repeated except that in the preparation of α-methylstyrene-acrylonitrile copolymers, polymerization was carried out employing catalysts and conditions indicated in Table 1.

EXAMPLE 2

α-methylstyrene-acrylonitrile oligomer

In the method of Example 1, polymerization was carried out using catalysts indicated in Table 3 and at a polymerization temperature at 120° for 5 hours. The resulting particulate polymer was dissolved in methyl ethyl ketone, followed by subjecting the solution to deposition with methanol, filtering, and vaporizing the methanol filtrate to dryness to obtain a pasty substance, which was then subjected to liquid chromatography to obtain a lower molecular weight polymer having a molecular weight of 200 to 500.

TABLE 3

| | Initiator | | Amount produced |
|---|---|---|---|
| | Kind | Amount (% by weight/ monomer) | (% by weight/ monomer) |
| Run No. 1 | a | 2.47 | 2.03 |
| Run No. 2 | f | 1.82 | 2.17 |

The α-methylstyrene-acrylonitrile copolymer as the component (A), obtained in Comparative Example 1, α-methylstyrene-acrylonitrile oligomer as the component (B), obtained according to the above method and the graft copolymer as the component (C), obtained in Example 1 were sufficiently mixed by Henschel mixer in composition indicated in Table 4, followed by subjecting the mixture to melt-kneading by means of an extruder to obtain pellets. The thus obtained thermoplastic resin compositions were evaluated in the same manner as in Example 1. The results are shown in Table 4.

TABLE 4

| | | Proportions of components in thermoplastic resin composition (% by weight) | | | Physical properties | | |
|---|---|---|---|---|---|---|---|
| | | Component A | Component B | Component C | Vicat's softening point (°C.) | Izod impact strength (kg · cm/cm) | Spiral flow (cm) |
| Example 1 | Run No. 1 | 80 | 0.50 | 20 | 117 | 5.8 | 28.2 |
| Example 1 | Run No. 2 | 80 | 0.25 | 20 | 117 | 5.4 | 27.1 |
| Example 1 | Run No. 3 | 60 | 0.52 | 40 | 114 | 21.00 | 24.6 |
| Compar. ex. 2 | Run No. 1 | 80 | 1.06 | 20 | 112 | 6.2 | 29.3 |
| Compar. ex. 2 | Run No. 2 | 80 | 0.54 | 20 | 114 | 2.0 | 30.2 |
| Compar. ex. 2 | Run No. 3 | 80 | 0.48 | 20 | 115 | 6.5 | 24.8 |
| Compar. ex. 1 | Run No. 1 | 80 | 0.04 | 20 | 117 | 5.5 | 24.5 |
| Compar. ex. 1 | Run No. 2 | 60 | 0.03 | 40 | 114 | 20 | 20.0 |
| Example 1 | Run No. 4 | 80 | 0.24 | 20 | 117 | 5.4 | 27.6 |
| Example 2 | Run No. 1 | 80 | 0.51 | 20 | 117 | 5.7 | 28.0 |
| Example 2 | Run No. 2 | 80 | 0.51 | 20 | 117 | 5.9 | 28.4 |

What we claim is:

1. A thermoplastic resin composition comprising 50 to 90 parts by weight of a random copolymer (A) consisting of α-methylstyrene units and acrylonitrile units, and having a number average chain length ($\overline{A}_n$) in the range of 800 to 1600 Å measured on the basis of polystyrene and a ratio [$\overline{A}_w/\overline{A}_n$] of its weight average chain length ($\overline{A}_w$) to its number average chain length in the range of 1.5 to 3.0, 0.2 to 1.0 parts by weight based on 100 parts by weight of said random copolymer (A), of an oligomer (B) consisting of α-methylstyrene units and acrylonitrile units and having a molecular weight of 200 to 500 and 10 to 50 parts by weight of a dienic rubber-aromatic vinyl monomer-vinyl cyanide graft copolymer (C).

2. A composition according to claim 1 wherein said random copolymer (A) is 65 to 75% by weight of α-methylstyrene and 25 to 35% by weight of acrylonitrile.

3. A composition according to claim 1 wherein said dienic rubber-aromatic vinyl monomer-vinyl cyanide graft-copolymer (C) is obtained by graft-copolymerizing 25 to 60% by weight of a monomer mixture of an aromatic vinyl monomer with a vinyl cyanide in the presence of 40 to 75% by weight of a dienic rubbery polymer.

4. A process for producing a thermoplastic resin composition which comprises simultaneously preparing 50 to 90 parts by weight of an α-methylstyrene-acrylonitrile random copolymer (A) consisting of α-methylstyrene units and acrylonitrile units, and having a number average chain length ($\overline{A}_n$) in the range of 800 to 1600 Å measured on the basis of polystyrene and a ratio [$\overline{A}_w$-

/$\overline{A}_4$] of its weight average chain length ($\overline{A}_w$) to its number average chain length in the range of 1.5 to 3.0, and an α-methylstyrene-acrylonitrile oligomer (B) consisting of α-methylstyrene units and acrylonitrile units and having a molecular weight of 200 to 500 according to a suspension polymerization method in such a manner that the content of said oligomer (B) is between 0.2 and 1.0 parts by weight based on 100 parts by weight of said random copolymer (A), followed by blending the resulting product with 10 to 50 parts by weight of a dienic rubber-aromatic vinyl monomer-vinyl cyanide graft-copolymer (C).

* * * * *